Feb. 3, 1970  R. L. SUTTON  3,492,997
HUSKING ROLLS
Filed March 28, 1966  2 Sheets-Sheet 1
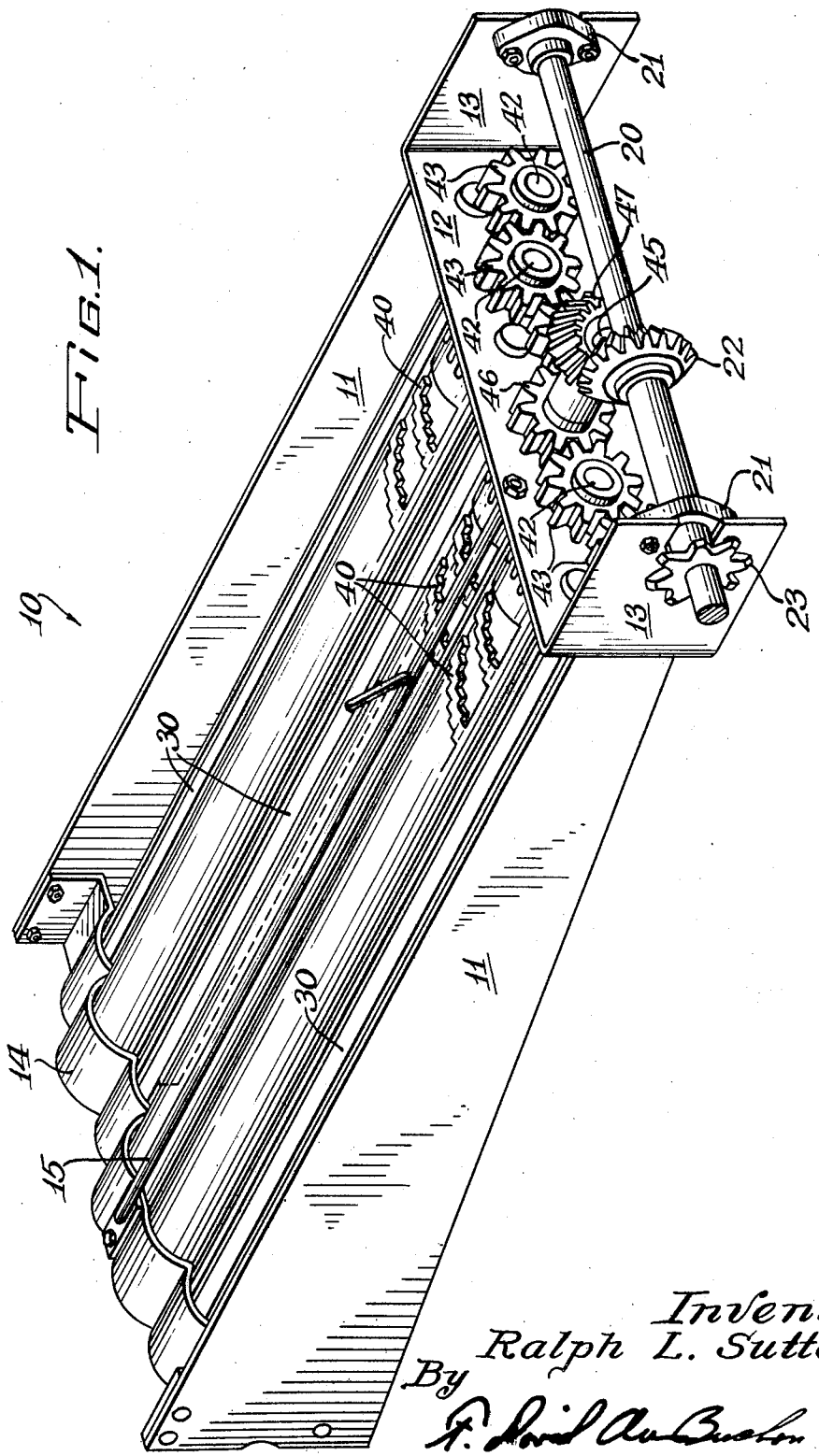
Inventor:
Ralph L. Sutton
By
F. David AuBuchon Atty.

Feb. 3, 1970  R. L. SUTTON  3,492,997
HUSKING ROLLS
Filed March 28, 1966  2 Sheets-Sheet 2
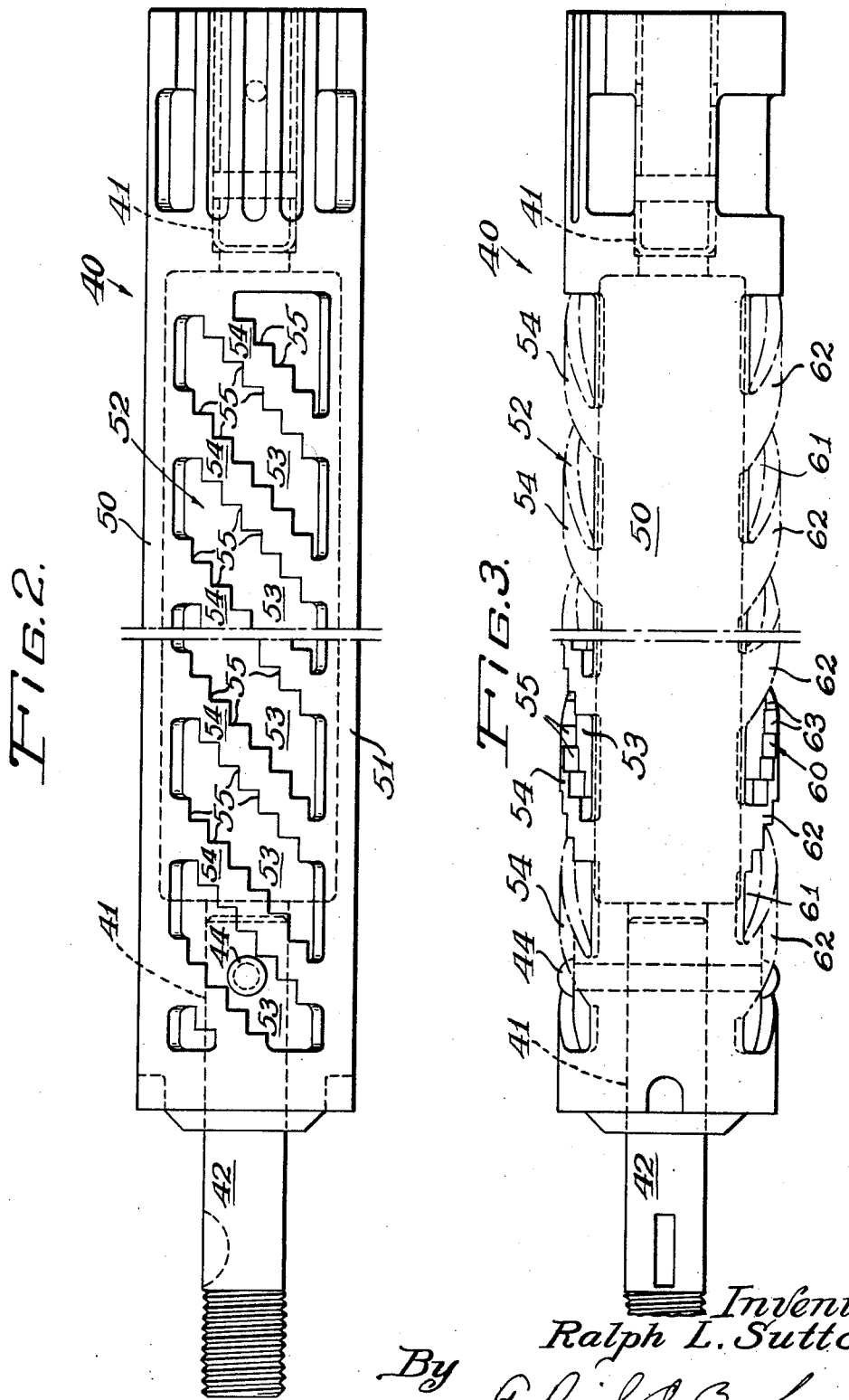
Inventor:
Ralph L. Sutton
By
 Atty.

United States Patent Office 3,492,997
Patented Feb. 3, 1970

3,492,997
HUSKING ROLLS
Ralph L. Sutton, Rock Island, Ill., assignor to International Harvester Company, Chicago, Ill., a corporation of New Jersey
Filed Mar. 28, 1966, Ser. No. 537,967
Int. Cl. A01f 11/06; A01d 45/02
U.S. Cl. 130—5                    2 Claims

ABSTRACT OF THE DISCLOSURE

A corn-husking roll that will enhance the likelihood of removing the husk when the ear of corn is orientated on the husking bed such that the butt end of the ear is away from the discharge end of the husking bed. The roll has one set of spiral grooves that will upon rotation of the roll cause the ear to advance along the roll in one direction and a second set of spiral grooves displaced 180° from the first set that will cause the ear to move in the opposite direction. These opposite movements cause the ear to rock and both ends of the ear are periodically moved toward the rolls where the free ends of the husk can be grasped.

---

The present invention relates generally to improvements in husking rolls for a corn harvesting machine, and more particularly to a new and improved husking roll that can be driven in either direction and will remove the husks from the ear corn regardless of which direction the ear corn is oriented with respect to the husking rolls.

In corn harvesting machines husking rolls are provided in parallel spaced-apart relation and are rotated in opposite directions such that the surfaces of the rolls frictionally engage the corn husk and pull the husk from the ear and deposit it below the husking rolls. The ears of corn lie in the grooves formed between adjacent rolls and travel down the rolls to a storage area or processing unit. The husks are grasped and pulled down between the husking rolls and are either dumped onto the ground or processed through other machinery.

In the past it has been the custom to cast husking rolls from steel providing an aggressive surface including a spiral for feeding the ears of corn axially along the roll. Since husking rolls work in pairs and are rotated in opposite directions, it is necessary that the spiral on cooperating rolls be wound in opposite directions. It has also been the custom to utilize one cast-steel type husking roll in combination with a roll of molded rubber, a second cast roll or a roll fabricated from a stack of rubber disks cut from tire carcasses. Husking rolls have been produced having a large variety of surface configurations for the purpose of providing a roll that is more or less aggressive. The type and condition of the corn to be harvested will dictate the type of husking rolls used in a particular situation.

A corn husk is connected to the core at the butt end of the ear and is free at the tip end of the ear. The most effective way to remove the husk from the ear is to pull the husk from the tip end of the ear towards the butt end of the ear. This means that if an ear is moving axially along the rolls, tip first, the free ends of the husk are in a leading position where it is unlikely that they will be grasped by the husking rolls. However, if the ears are moving along the rolls, butt first, the free ends of the husks are in a trailing position where they are in effect fed into engagement with the husking rolls and it is quite likely that they will be grasped and removed. In the prior art the helical ribs of the husking rolls extend in only one direction and thus tend to propel the ears in the direction in which they lie and if this is tip end first the likelihood of the husk being removed is diminished.

The general purpose of this invention is to provide a husking roll which embraces all the advantages of similarly employed husking rolls and can yet remove the husk regardless of the relative position of an ear to the husking roll. To attain this the present invention contemplates a husking roll having a unique surface configuration including a series of spiral grooves located in a first area of the surface and extending in one direction and a second series of spiral grooves located in a second area of the surface and extending in the opposite direction. By this provision the husks are pulled in both directions and can be removed from the ear regardless of the position of the ear relative to the husking roll.

An object of the present invention is the provision of a husking roll that can pull the husks from an ear of corn in either direction.

Another object is to provide a husking roll having spiral grooves of respective opposite pitch formed on the husk engaging surface in such a manner as to extend in respective directions opposite to one another circumferentially of the roll as they extend in the same direction axially thereof.

A further object of the invention is the provision of a corn husking roll having helical ribs with teeth on both sides thereof extending axially in both directions along the husk engaging surface.

These and other objects of the invention will become more apparent from the specification and drawings, wherein:

FIGURE 1 is a perspective view of a corn husking bed including the subject corn husking rolls;

FIGURE 2 is a plan view of the corn husking roll having its center portions broken away; and FIGURE 3 is a plan view of the corn husking roll rotated 90 degrees from that shown in FIGURE 2 and also having its center portions broken away.

Referring now to the drawings wherein like characters designate like or corresponding parts throughout the several views there is shown in FIGURE 1 a corn husking bed 10 including husking rolls incorporating the subject invention. The framework for the corn husking bed 10 includes a pair of side plates 11 connected at one end to end plate 12. The other ends of the side plates 11 are also connected by an end plate that is not visible in FIGURE 1. End plate 12 has a pair of flanges 13 that extend in the same direction as side plates 11. A shield 14 covering the ends of the husking roll at the discharge end (left end as seen in FIGURE 1) of the husking bed is secured to side plates 11. A bar-shaped roll divider 15 extends from the shield 14 to the end plate 12 and functions to direct ears to either one set of rolls or another. The flanges 13 of end plate 12 support bearings 21 that journal a drive shaft 20. The drive shaft 20 has secured thereto between flanges 13 a bevel gear 22. The drive shaft 20 also has secured thereto a sprocket 23 on a portion of the shaft protruding through one of the flanges 13. Rotary motion is supplied to the shaft 20 through the sprocket 23 and as shall be discussed in more detail, rotary motion is supplied to the husking rolls through the bevel gear 22.

In the corn husking bed 10 shown in FIGURE 1, there are three aggressive husking rolls 40 each of which cooperate with a rubber laminated husking roll 30. In the husking bed shown the aggressive husking rolls 40 are located in a plane slightly above the plane of the rubber laminated husking rolls 30. This invention concerns the surface configuration of the aggressive husking rolls 40.

As can be best seen in FIGURES 2 and 3 each end of the aggressive husking rolls 40 is provided with a cylindrical opening 41 into which a stub shaft 42 can be inserted and secured in position by a rivet 44 or the like. The rubber laminated husking roll 30 likewise has similar stub shafts 42 extending from each end. The stub shafts 42 are journalled in bearings (not shown) carried by the end plate of the corn husking bed. At the right-hand end of the corn husking bed 10 as seen in FIGURE 1 the stub shafts have spur gears 43 secured thereto. One of the husking rolls 40 has a longer stub shaft 45 that carries a spur gear 46 and also a bevel gear 47. The spur gears 43 and 45 are all arranged to mesh with the adjacent spur gear thus by rotating the stub shaft 45 rotary motion will be supplied to each of the husking rolls. Also, it should be noted that each husking roll will be rotated in a reversed direction to the adjacent roll or rolls. The beveled gear 47 carried by the long stub shaft 45 is arranged to mesh with the beveled gear 22 carried by the drive shaft 20 thus upon rotating drive shaft 20 through the sprocket 23 rotary motion is supplied to all of the corn husking rolls.

Referring now to FIGURES 2 and 3 the cylindrical surface of one of the aggressive husking rolls 40 will be described. The husking roll has a generally cylindrical surface formed about the axis of the husking roll. The generally cylindrical surface of the husking roll is divided into a first smooth section 50, a second smooth section 51, a first aggressive section 52 and a second aggressive section 60. The first and second smooth sections 50 and 51 respectively are located diametrically opposite to each other on the surface of the husking roll. Also, the first and second aggressive sections are located diametrically opposite to each other on the cylindrical surface of the husking roll. Since, except for the opposite spirals, the first and second aggressive surfaces 52 and 60 are identical, only the surface 52 will be described in detail. The first aggressive surface 52 is provided with a plurality of first grooves 53 recessed into the surface of the husking roll. The grooves are spaced from each other such that ribs 54 are formed separating the grooves from each other. The grooves and therefore the ribs are arranged at an angle of approximately 40° to the axis of the husking roll. It has been found that the provision of ribs lying at approximately 40° to the axis of the roll results in the optimum husking. Teeth 55 are formed along both sides of the ribs 54 to render them more aggressive. By providing teeth 55 on both sides of the ribs 54 the husking roll can be inserted into the husking bed in either direction and thus it is not necessary to manufacture both right- and left-hand husking rolls. This is important particularly where it is desirable to use two aggressive husking rolls 40 in cooperation with each other.

The second aggressive section 60 is identical to the first aggressive section, including second grooves 61 forming second ribs 62 and having teeth 63 formed on the sides of the ribs 62.

Operation

Ears of corn having the husk intact are deposited upon the receiving end (right-hand end as seen in FIGURE 1) of the corn husking bed 10. Since in each set of husking rolls one of the rolls is located in a plane higher than the other, longitudinal troughs are created between the mating rolls. The rotation of the husking rolls tends to arrange the ears longitudinal of the rolls in the aforementioned troughs. Some of the ears however have their butt ends towards the discharged end of the corn husking bed and others will have their tip ends towards the discharged end of the corn husking bed. It is the custom to arrange corn husking beds such that there is a pitch from the receiving end downwardly towards the discharge end and also to provide forwarding means above the corn husking bed for moving the ears from the receiving to the discharged end. The spiral surfaces of the corn husking rolls also contribute to moving the ears towards the discharged end of the corn husking bed. Under the influence of the above, the ears begin their movement down the trough towards the discharged end of the corn husking bed. If an ear has been oriented on the corn husking bed such that the tip end of the ear faces towards the discharge end of the corn husking bed it is quite likely that the husk will not be removed from the ear. This is because the husks are connected to the ear at the butt end and there are no free ends that can be grasped by the aggressive surfaces at the trailing end of the ears. The free ends of the husk are located at the tip end of the ear and with the ear in this position the free ends have a tendency to be moved away from the aggressive surfaces of the husking rolls and quite often they escape being grasped.

In the aggressive husking rolls of the subject invention, the grooves and ribs of the first agressive section run in the opposite direction than do the grooves and ribs of the second aggressive section thus as an ear of corn travels along the husking rolls once in every revolution of the husking roll there will be a tendency to reverse the direction of travel of the ear. In other words, the ear will not travel smoothly at a constant speed down the husking roll but rather will travel, in effect, forward and then rearward. During this rearward step, an ear of corn traveling tip end first will have an opportunity for the free end of the husk located at the tip to be grasped by the husking rolls when contacted by the reverse ribs. Once the end of the husk has been grasped it will be torn from the ear regardless of the movement of the ear.

Obviously many modifications and variations of the present invention are possible in the light of the above teachings. It is, therefore, to be understood that within the scope of the appended claims, the invention may be practiced otherwise than as specifically described.

What is claimed is:

1. For use with a corn picker, a husking roll having a generally cylindrical surface, said cylindrical surface comprised of first and second smooth sections and first and second aggressive sections, each of said first sections being located diametrically opposed to the corresponding second sections and each of said sections extending axially alng the cylindrical surface of said husking rolls, said first aggressive section having a plurality of first grooves formed in the cylindrical surface thereof, said first grooves extending at an acute angle to the axis of the husking roll and substantially parallel to each other thus forming ribs between adjacent grooves, the configuration of said first grooves functioning to cause material engaged by said first aggressive section to be fed in a given axial direction, said second aggressive section having a plurality of second grooves formed in the cylindrical surface thereof, said second grooves extending at an acute angle to the axis of the husking roll and substantially parallel to each other thus forming ribs between adjacent grooves, the angle of said second grooves to the husking roll axis being arranged opposite to the angle of said first grooves, the configuration of said second grooves functioning to cause material engaged by said second aggressive section to be fed in a direction opposite to said given axial direction.

2. The invention as set forth in claim 1 wherein teeth are formed on both walls of said ribs.

References Cited

UNITED STATES PATENTS

| 1,682,142 | 8/1928 | Paradise et al. |
| 1,764,686 | 6/1930 | Kuhlman. |
| 3,054,163 | 9/1962 | Lakin. |

RICHARD F. GUIDA, Primary Examiner

U.S. Cl. X.R.

56—1